(No Model.)

L. HEGLER.
DISH CLEANER.

No. 477,415. Patented June 21, 1892.

Witnesses
J. Edw. Maybee
H. G. McMillan

Inventor
Lizzie Hegler
by Donald C. Ridout & Co.
Attys.

UNITED STATES PATENT OFFICE.

LIZZIE HEGLER, OF TORONTO, CANADA.

DISH-CLEANER.

SPECIFICATION forming part of Letters Patent No. 477,415, dated June 21, 1892.

Application filed October 22, 1891. Serial No. 409,537. (No model.)

*To all whom it may concern:*

Be it known that I, LIZZIE HEGLER, of the city of Toronto, in the county of York, in the Province of Ontario, Canada, have invented a certain new and Improved Machine for Washing Dishes, of which the following is a specification.

The object of my invention is to provide a device by which dirty dishes may be thoroughly cleansed and rinsed without wetting or soiling the hands of the party using the washing device; and it consists, essentially, of an open wire case arranged to contain the dishes and pivoted within a compartment containing water, with or without soap or washing compound, substantially as hereinafter more particularly explained, and then definitely claimed.

Figure 1:
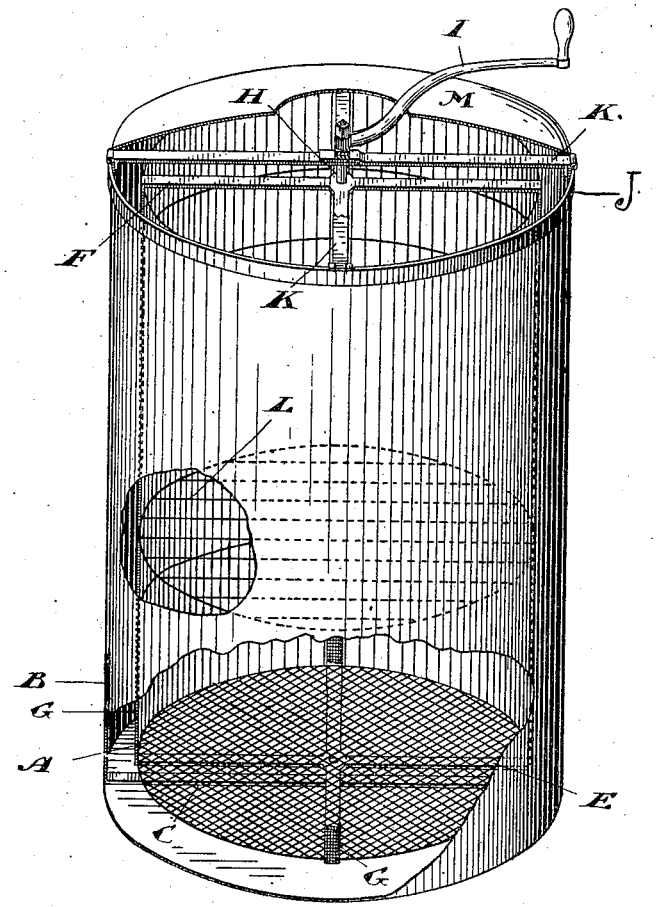
Figure 2:
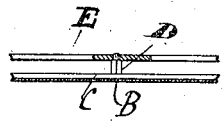

Figure 1 is a perspective view of my improved washer, portions of the outer casing or compartment being broken away to expose its interior construction. Fig. 2 is a detail of the lower pivot-pin.

In the drawings, A represents an open wire casing, preferably made cylindrical in form and strongly braced either in the manner shown or in any other suitable way.

B is an outer casing or compartment to contain the inner wire casing A. A bar C is riveted or otherwise secured to the bottom of the casing B, serving as a stay or brace for the said bottom and having a projecting pin D in its center to form the pivot on which the casing A is supported.

It will be observed that cross-bars E are secured to the bottom of the casing A, staying or bracing the said bottom so as to make it sufficiently strong to carry the dishes it is intended to contain. In the center of the cross-bars E, I form a hole to receive the end of the pivot-pin D. It will of course answer the same purpose if the pivot-pin D projects from the center of the cross-bars E instead of from the center of the bar C, as indicated in Fig. 2. I prefer, however, to have it project from the bar C, as the casing A would not stand flat on its bottom were the pin D to project below it. Cross-bars F are placed on top of the casing A, and are connected by side bars G to the cross-bars E at the bottom of the said casings. These bars stay the casing A, so as to make it sufficiently strong to hold the dishes it is intended to contain. As before stated, I do not confine myself to any particular way of staying the said casing, but merely show the plan illustrated as one of the ways in which the said casing may be strengthened.

A spindle H projects from the center of the cross-bars F, and has a crank-handle I attached to it, as indicated. With the view of holding the casing A in the center of the outer casing B, and at the same time to enable the casing A to be readily removed from the casing B, when desired, I hinge on the ring J, which surrounds the top of the casing B, four bars marked K, a hole being made near the end of each bar K to fit over the spindle H, as indicated in Fig. 1. When the casing A is pivoted on the end of the pin D and the spindle H is centrally journaled in the holes through the bars K, the said casing may be readily revolved by means of the crank-handle I.

In order to wash the dishes, they are arranged within the casing A, horizontal wires L being preferably arranged within the said casing A, so as to support the dishes in a vertical position; but I do not confine myself to the use of horizontal wires nor to any particular plan for arranging the dishes. When the dishes have been arranged in the casing A and the outer casing B is filled with water and soap or other washing compound, the casing A is caused to revolve by means of the crank-handle I until the plates and dishes are thoroughly cleansed. The crank-handle I is then removed, the bars K thrown back, and the casing A raised out of the casing B and reinserted in a casing similar to B but containing clean water. The casing A is revolved in the same manner in the casing containing clean water, rinsing the plates and dishes, which may then be removed and placed to dry; or the casing A may be withdrawn and the dishes allowed to remain in it until they have become dry. I prefer to have a cover M for the casing B.

I show my improved dish-washing device cylindrical in form, as I think that form the most suitable; but I do not confine myself to any particular form, as it might be made almost any shape and yet accomplish its purpose.

What I claim as my invention is—

In a dish-washing machine, an outer casing B, a dish-receptacle comprising the wire casing A, strengthened by the skeleton frame E F G and pivoted on a pin D in the bottom of the outer casing B, a spindle H, projecting from the cross-bars F of the skeleton frame, the bars K, each hinged at its outer end to the outer casing and having a hole in its outer end, forming a journal for the spindle H, and to a crank I, fixed to said spindle, substantially as shown and described.

Toronto, August 18, 1891.

LIZZIE HEGLER.

In presence of—
A. M. NEFF,
I. EDW. MAYBEE.